United States Patent
Shimamori et al.

[11] Patent Number: 5,724,235
[45] Date of Patent: Mar. 3, 1998

[54] OVERCURRENT PROTECTING DEVICE FOR USE IN DC—DC CONVERTER

[75] Inventors: Hiroshi Shimamori; Sentarou Tokimi, both of Kawasaki; Tohru Futakawa; Hiroyuki Suzuki, both of Ohtemachi, all of Japan

[73] Assignees: Fujitsu Ltd., Kawasaki; Shindengen Electric Mfg., Co., Ltd., Tokyo, both of Japan

[21] Appl. No.: 774,305

[22] Filed: Dec. 26, 1996

[30] Foreign Application Priority Data

Dec. 27, 1995 [JP] Japan .................. 7-340294

[51] Int. Cl.$^6$ .................. H02M 3/335
[52] U.S. Cl. .................. 363/21
[58] Field of Search .................. 363/16, 20, 21, 363/95, 97, 131

[56] References Cited

U.S. PATENT DOCUMENTS

| | | | |
|---|---|---|---|
| 4,841,425 | 6/1989 | Maeba et al. | 363/21 |
| 5,519,599 | 5/1996 | Shinada et al. | 363/21 |
| 5,619,403 | 4/1997 | Ishkawa et al. | 363/21 |
| 5,631,810 | 5/1997 | Takano | 363/21 |

*Primary Examiner*—Matthew V. Nguyen
*Attorney, Agent, or Firm*—Staas & Halsey

[57] ABSTRACT

The present invention relates to a DC-DC converter, and aims at preventing a flywheel switch from being destroyed. A PWM control circuit outputs an oscillation signal in order to alternately switch between a main switch and a rectification switch, and a flywheel switch. A state detecting unit generates a control instruction signal for a controlling unit, if the DC-DC converter is powered down or if it is overloaded. The controlling unit turns off the flywheel switch by controlling a driving circuit which controls the on/off status of the flywheel switch. An electric current $I_{Q2}$ flows via a parasitic diode $D_{Q2}$, when the flywheel switch is turned off. With the above described configuration, the flywheel switch can be prevented from being destroyed, when the DC-DC converter is overloaded, or when an overcurrent occurs due to power-down.

15 Claims, 12 Drawing Sheets

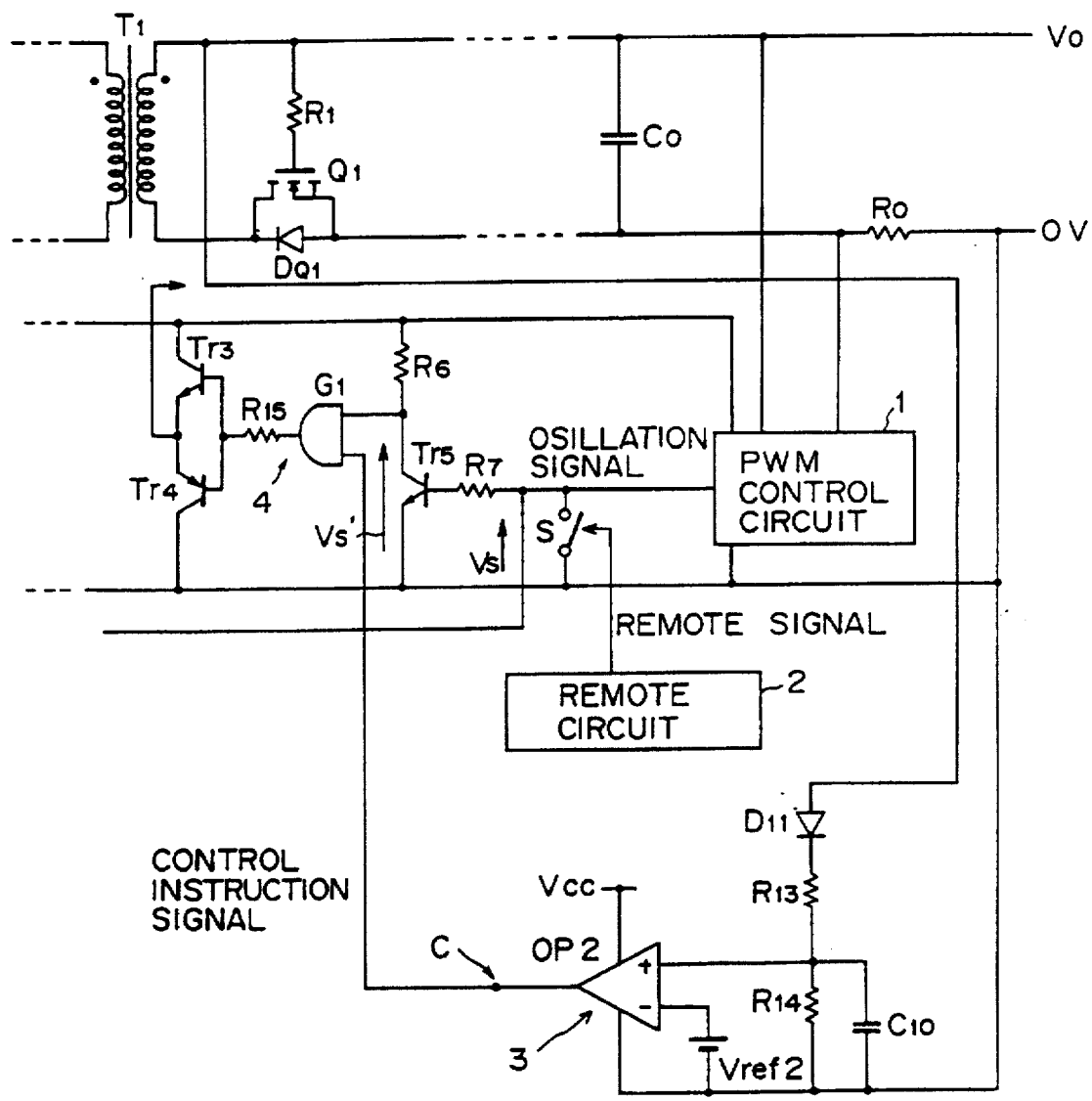
F I G. 10

OVERCURRENT PROTECTING DEVICE FOR USE IN DC— DC CONVERTER

BACKGROUND OF THE INVENTION

Field of the Invention

The present invention relates to a DC-DC converter employing a switching regulator technique, and particularly to a device for protecting components for use in a DC-DC converter from an overcurrent occurring in an abnormal state, overload state, or a power-down state, in the DC-DC converter providing a steady supply of power to a data processing device such as a computer, etc., which is a load.

Power supply to the data processing device, such as a computer, is normally rectified and smoothed by a rectifying circuit after power for commercial use is high-harmonics-compensated, so that a high direct-current voltage is generated. A low direct-current voltage is then generated from the high direct-current voltage by a DC-DC converter, and supplied to a computer, etc. which is the load. As a result, power is stably supplied.

FIG. 1 shows the simplified structure of a known forward converter as an example of the configuration of a conventional DC-DC converter.

In the DC-DC converter shown in FIG. 1, a main switch Q103 implemented by a MOSFET, is connected to a primary side of a main transformer T1 in series. A rectifying diode D101 is connected to a secondary side of the main transformer T1 in series, while a flywheel diode D102 is connected to the secondary side of the main transformer T1 in parallel. With the DC-DC converter, a stable power supply can be realized by changing a duty factor of a low voltage Vo generated in the secondary side by converting a high direct current voltage Vin input to the primary side of the main transformer T1, using a high-frequency switching of the main switch Q103 and a voltage value detected on a load side. As a result, the stable power supply is provided to a data processing device such as a computer, etc., which is the load.

The main switch Q103 is turned on/off at a high frequency by a PWM control circuit, not shown in this figure.

That is, the main switch Q103 is controlled by an oscillation signal output from the PWM control circuit, and a duration during which the main switch Q103 is turned on is changed by making a change to a duty factor of the oscillation signal output from the PWM control circuit, so that the output voltage Vo can be supplied at a constant level even if the voltage on the load side fluctuates.

The DC-DC converter shown in FIG. 1, however, employs the rectification diode D101 and flywheel diode D102, which are implemented by a pn junction diode, and the power consumption dissipated due to their voltage drops is approximately one half of the power consumed by the DC-DC converter shown in FIG. 1. In recent years, an operating voltage of a load such as a data processing device including a computer, etc., that is,the output voltage Vo supplied from the DC-DC converter to such a device, has tended to go down, for example, from 5V to 3V, in addition to the dissipated power consumption. Therefore, the voltage drop of approximately 0.7V in these diodes cannot be ignored. In other words, the voltage required on the device side, that is, the voltage supplied from the DC-DC converter to a device on the load side, goes down, so that the ratio of the voltage drop in the diodes for use in the DC-DC converter becomes relatively high.

Accordingly, these diodes prevent both a reduction in the power consumption of the DC-DC converter, and an improvement in conversion efficiency. Because a heat sink must be attached to these diodes, it prevents a downsizing of the DC-DC converter. Note that similar problems occur if the rectification diode D101 and flywheel diode D102 are implemented by a Schottky Barrier Diode (SBD).

To overcome the above described problems, a DC-DC converter which does not employ the rectification diode D101 and the flywheel diode D102 has been developed in recent days. FIG. 2 shows the structure of this DC-DC converter.

In FIG. 2, a rectification switch Q1 and a flywheel switch Q2, both of which are implemented by a MOSFET, are respectively employed instead of the rectification diode D101 and the flywheel diode D102. In this figure, a main switch Q3 which is implemented by a MOSFET, and corresponds to the main switch Q103 implemented by the MOSFET shown in FIG. 1, is arranged in a similar manner. In this DC-DC converter, switching is made between the flywheel switch Q2 and a main switch Q3. The rectification switch Q1 synchronizes with the main switch Q3, and the rectification switch Q1 and the flywheel switch Q2 are turned on/off alternately.

A PWM control circuit 1 controls the switching between the flywheel switch Q2, and the main switch Q3. That is, an oscillation signal output from the PWM control circuit 1 switches between the main switch Q3 and the flywheel switch Q2. A driving transformer T2 is arranged to drive the main switch Q3. To switch between the rectification switch Q1 and the flywheel switch Q2, and synchronize the rectification switch Q1 with the main switch Q3, the connection point of the rectification switch Q1 is changed from being on a high-electric-potential side of the rectification diode shown in FIG. 1 to being on a low-electric-potential side shown in FIG. 2. An output voltage of the main transformer T1 is applied to its gate.

Since the DC-DC converter shown in FIG. 2 does not employ the rectification diode D101 and the flywheel diode D102, which are implemented by a pn junction diode, etc., as described above, the voltage drop and the power consumption are reduced. Consequently, low power consumption, high conversion efficiency, and downsizing of the DC-DC converter can be realized.

A further review of the DC-DC converter shown in FIG. 2, made by the inventor of this application, revealed the fact that the problems shown in FIGS. 3 and 4 occur when the DC-DC converter is both powered down, and when it is overloaded.

FIG. 3 shows operations performed by the DC-DC converter shown in FIG. 2 when the DC-DC converter is powered down.

Oscillation on/off of the PWM control circuit 1 in the DC-DC converter is controlled by providing/stopping the supply of an input voltage Vin. In addition, a remote circuit 2 shown in FIG. 2 is arranged to control the oscillation of the PWM control circuit 1 based on a remote signal from the remote circuit 2, so that the oscillation of the PWM control circuit 1 can be implemented by an external input to the DC-DC converter. That is, the oscillation of the signal output from the PWM control circuit 1 is controlled by controlling turning on/off a switch S using the remote signal, thereby controlling the output from the DC-DC converter. As a result, providing/stopping the supply of the input voltage to the load can be controlled according to the remote signal which is externally input.

As an example of the output control of the DC-DC converter according to the remote signal, for example, if the remote signal is driven high, the switch S is turned off to output an oscillation signal from the PWM control circuit 1. The oscillation signal is transmitted to the main switch Q3 via a driving circuit of the main switch Q3 which is composed of transistors Tr1 and Tr2, and a driving transformer T2, so that the main switch Q3 is turned on/off.

The input voltage Vin is applied to the main transformer T1 by turning on/off the main switch Q3. A voltage corresponding to a ratio of the number of turns on the primary side to that on the secondary side of the main transformer T1, is caused on the secondary side of the main transformer T1, depending on the on/off ratio of the main switch Q3. The voltage on the secondary side of the main transformer T1 is lowered to a suitable level using a resistor R1, and applied to the gate of the rectification switch Q1, so that the rectification switch Q1 is switched.

Similarly, the flywheel switch Q2 is switched by an oscillation signal output from the PWM control circuit 1 according to the state in which the switch S is turned off due to the high level of the remote signal, which is passed through the driving circuit of the flywheel switch Q2 composed of the transistors Tr3 and Tr4, and dropped to a suitable level by the resistor R2, and applied to the gate of the flywheel switch Q2.

An output voltage Vo of the DC-DC converter can be output as a value according to the duty factor of the oscillation signal from the PWM control circuit 1, by using the switching control of the above described switches Q1, Q2, and Q3.

In the meantime, if the remote signal is driven low, the switch S is turned on to stop the oscillation signal from the PWM control circuit 1, and the low level (0V) is maintained. Accordingly, no voltage is applied to the transistors Tr1 and Tr2 included in the driving circuit of the above described main switch Q3, and the driving transformer T2. As a result, the main switch Q3 remains off. Since the input voltage Vin is not applied from the primary side of the main transformer T1 to its secondary side, the output voltage Vo of the DC-DC converter results in 0V. The right-hand side from the dotted line indicating the power supply stop in FIG. 3 shows each voltage in each part of the DC-DC converter after the remote signal from the remote circuit 2 is turned off at the time of stopping the power supply, that is, on the condition that the remote signal makes a transition from a high level H (indicating a power supply voltage Vcc of the circuitry which is hereinafter referred to as the high level H) to a low level L (indicating a reference voltage of the circuitry, such as 0V, which is hereinafter referred to as the low level L).

The high-to-low (H-to-L) transition of the remote signal turns on the switch S, which drives a voltage Vs shown in FIG. 2 low, and stops the oscillation signal from the PWM control circuit 1. The low level of the voltage Vs turns off a transistor Tr5, so that a voltage Vs' shown in FIG. 2 remains high as shown on the right-hand side of FIG. 3. Accordingly, an output from the driving circuit of the flywheel switch Q2, which is composed of the transistors Tr3 and Tr4, remains high, and the flywheel switch Q2 remains on. If the remote signal is low and the switch S is turned on, the voltage Vs is driven low and applied to the bases of the transistors Tr1 and Tr2, which configure the driving circuit of the main switch Q3, as it is. Therefore, a driving signal does not occur, and the rectification switch Q1 and the main switch Q3 remain off.

In the state shown on the right-hand side of FIG. 3, after an electric current $I_{Q2}$ running through the flywheel switch Q2 flows in a forward direction (indicated by a solid line arrow in FIG. 2) for a time, it flows in a reverse direction (indicated by an arrow of a dotted line in FIG. 2). The reasons are as follows.

As shown on the left-hand side of FIG. 3, the flywheel switch Q2 is originally turned off after it remains on for a predetermined duration by repeatedly outputting/stopping outputting the oscillation signal (voltage Vs) of the PWM control circuit 1, and at the same time, the rectification switch Q1 and the main switch Q3 are turned on. Accordingly, the waveform of the electric current $I_{Q2}$ becomes as that shown on the left-hand side of FIG. 3, and a reverse current does not flow.

If the voltage Vs' remains high as shown on the right-hand side of FIG. 3, the flywheel switch Q2 remains on, while the rectification switch Q1 and the main switch Q3 remain off. At this time, an electric current path composed of the flywheel switch Q2, inductance Lo, and a smoothing capacitor Co, is formed due to the on state of the flywheel switch Q2. This electric path is a bidirectional electric current path, that is, a forward current path indicated by the arrow of solid line and a reverse current path indicated by the dotted line arrow in FIG. 2. This is because the flywheel switch Q2 is a switching element which allows an electric current to flow bidirectionally.

After a predetermined amount of time elapses from the beginning of the running of the electric current along the forward current path due to the on state of the flywheel switch Q2, an electric charge made to a capacitor Co connected between the output terminals (hereinafter abbreviated to the output capacitor), runs along the reverse current path. As the output capacitor Co, a capacitor (such as a memory capacitance, etc.) included in a computer, which is the load, can be considered. However, this specification only refers to the smoothing capacitor Co as an example, in order to make the explanation brief.

If the capacitance of the smoothing capacitor Co is large in the case in which the reverse current flows, the electric current $I_{Q2}$ flowing in the reverse direction becomes higher as time goes by, as shown in FIG. 3. Therefore, the problem that the flywheel switch Q2 may be destroyed may be proved to newly arise.

FIG. 4 shows operations performed by the DC-DC converter shown in FIG. 2, when it is overloaded.

Normally, the PWM control circuit 1 in the DC-DC converter detects an overcurrent in order to protect the DC-DC converter itself, or to protect a load from the overcurrent. It can detect a flow of an electric current higher than a rated current under an abnormal load condition. A capability for detecting a value of an electric current is arranged as a means for detecting an overcurrent in the PWM control circuit 1. The value of the electric current for the load is controlled by monitoring an electric current flowing on a ground voltage side of an output terminal circuit, controlling a width of the oscillation signal of the PWM control circuit 1 based on a detected value of the electric current, and controlling an output from the DC-DC converter.

If an overcurrent does not flow, the PWM control circuit 1 does not perform control by detecting the overcurrent, and the output voltage Vo of the DC-DC converter depends on the duty factor of the oscillation signal from the PWM control circuit 1. If the overcurrent flows, the PWM control circuit 1 performs control by detecting the overcurrent, and sets the duty factor of the oscillation signal so that a duration of an off state becomes longer. Therefore, the output voltage Vo of the DC-DC converter becomes lower as the on-duty of the oscillation signal from the PWM control circuit 1 becomes smaller. Since detection of an overcurrent makes the output voltage Vo from the DC-DC converter lower, an amount of energy transmitted from the primary side to the secondary side decreases. As a result, the output voltage Vo from the DC-DC converter drops, which enables an operation at a rated voltage. The right-hand side of FIG. 4 shows this state.

If an overload state is detected at the time point indicated by the dotted line in the middle of this figure, the duration of the low level of the oscillation signal becomes extremely long, in order to make the on-duty of the oscillation signal from the PWM control circuit 1 smaller. As a result, the duration of the low level of the voltage Vs shown in FIG. 2 becomes longer. The flywheel switch Q2 therefore remains on, while the rectification switch Q1 and the main switch Q3 remain off, in a similar manner as in FIG. 3 showing the case of the power supply stop. Consequently, the electric current $I_{Q2}$ running through the flywheel switch Q2 flows in a forward direction for a time, and then flows in a reverse direction.

Accordingly, if the capacitance of the smoothing capacitor Co is large as shown in FIG. 3, the electric current $I_{Q2}$ flowing in the reverse direction becomes higher as time goes by, as shown in FIG. 4. Therefore, the problem that the flywheel switch Q2 is destroyed is proved to arise in a similar manner as in FIG. 3.

SUMMARY OF THE INVENTION

An object of the present invention is to provide a DC-DC converter which protects a flywheel switch implemented by a MOSFET, from being destroyed by an overcurrent when an overload is imposed or when a power supply is stopped.

According to the present invention, a state detecting circuit for generating a control instruction signal based on a state of a DC-DC converter, and a control circuit for controlling a flywheel switch based on the control instruction signal, are arranged, so that the flywheel switch can be turned off by, for example, detecting a state in which an overcurrent flows through the flywheel switch, and generating the control instruction signal to turn off the flywheel switch, if a DC-DC converter is in a predetermined state; as a result, an electric charge applied to an output capacitor can be prevented from flowing through the flywheel switch by shutting off a reverse electric current path formed until then, when it is overloaded or when a power supply is stopped; and the flywheel switch can be prevented from being destroyed by a reverse current even if the capacitance of the output capacitor is large, in a DC-DC converter.

BRIEF DESCRIPTION OF THE DRAWINGS

FIG. 10 is a circuit diagram showing the core parts of a third embodiment of the present invention;

DESCRIPTION OF THE PREFERRED EMBODIMENTS

Figure 5:
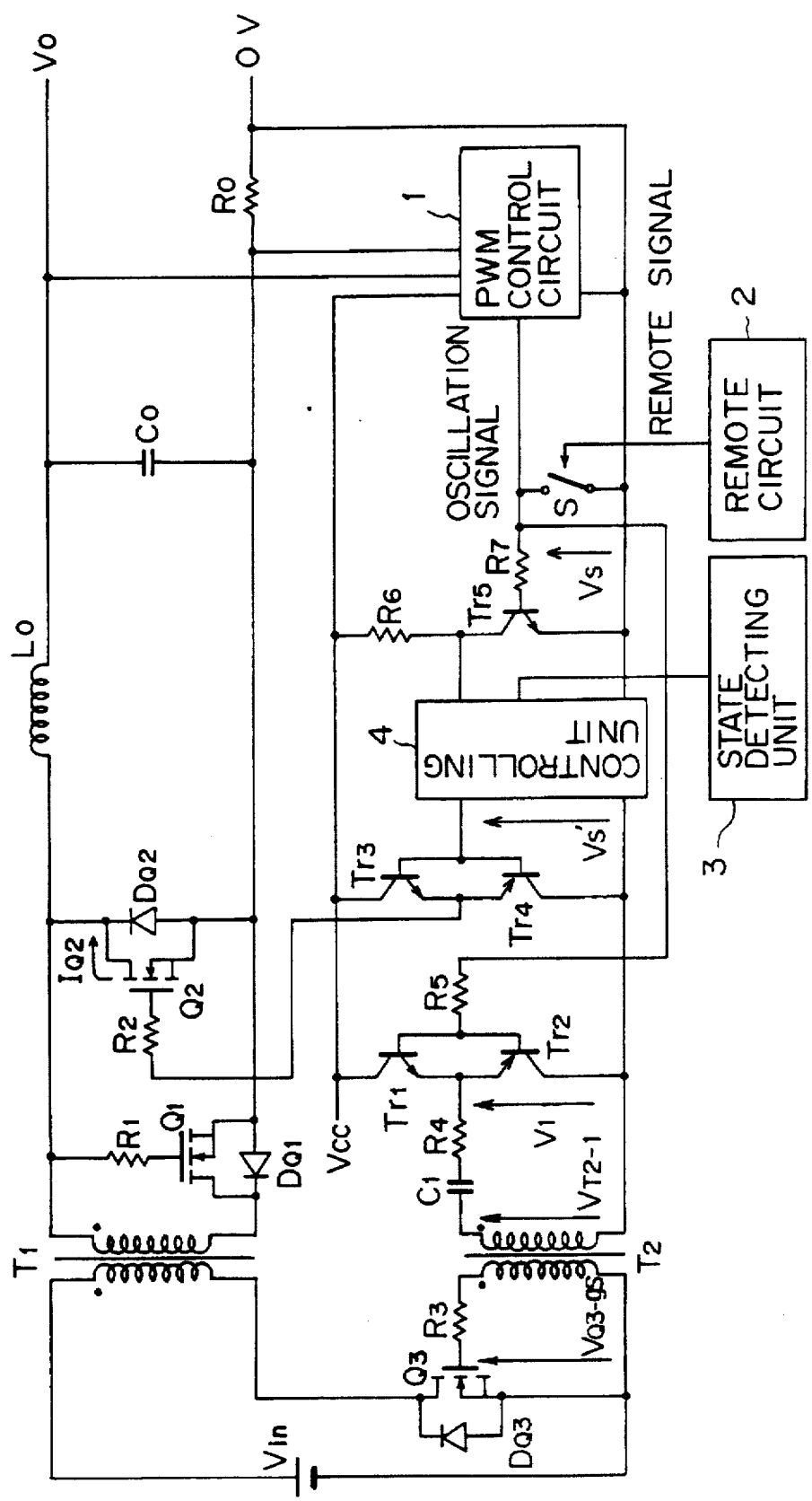
FIG. 5 is a circuit diagram showing the configuration of the present invention.

FIG. 5 is a circuit diagram showing the principle of the present invention, and shows a device for protecting a switching element on a flywheel side in a DC-DC converter to which a switching regulator technique is applied, according to the present invention.

In this figure, a DC-DC converter comprises a main transformer T1, main switch Q3 connected to a primary side of the main transformer T1 in series, rectification switch Q1, which is connected to a secondary side of the main transformer T1 in series, flywheel switch Q2, which is connected to the secondary side of the main transformer T1 in parallel, PWM control circuit 1, control unit 4, state detecting unit 3, a driving circuit which is composed of transistors Tr3 and Tr4 and drives the flywheel switch Q2 according to an output from the PWM control circuit, a driving circuit which is composed of transistors Tr1 and Tr2 and drives the main switch Q3 according to an output from the PWM control circuit, and a driving transformer T2 insulating the main switch Q3 connected to the primary side of the main transformer T1 from the driving circuit of the main switch Q3 on the secondary side.

The PWM control circuit 1 switches between the main switch Q3 and the rectification switch Q1, and the flywheel switch Q2 via the respective driving circuits, and detects an output value of an electric current, so that an oscillation signal whose duty factor depends on the detected output value of the electric current, can be output. The state detecting unit 3 detects an overload state, or a state in which a power supply is stopped, according to a voltage output from the DC-DC converter, and provides a control instruction signal to the control unit 4 based on the detected state. The control signal output from the control circuit 4 becomes a driving signal of the flywheel switch Q2 in the driving circuit composed of the transistors Tr3 and Tr4, which drives the flywheel switch Q2.

Figure 3:
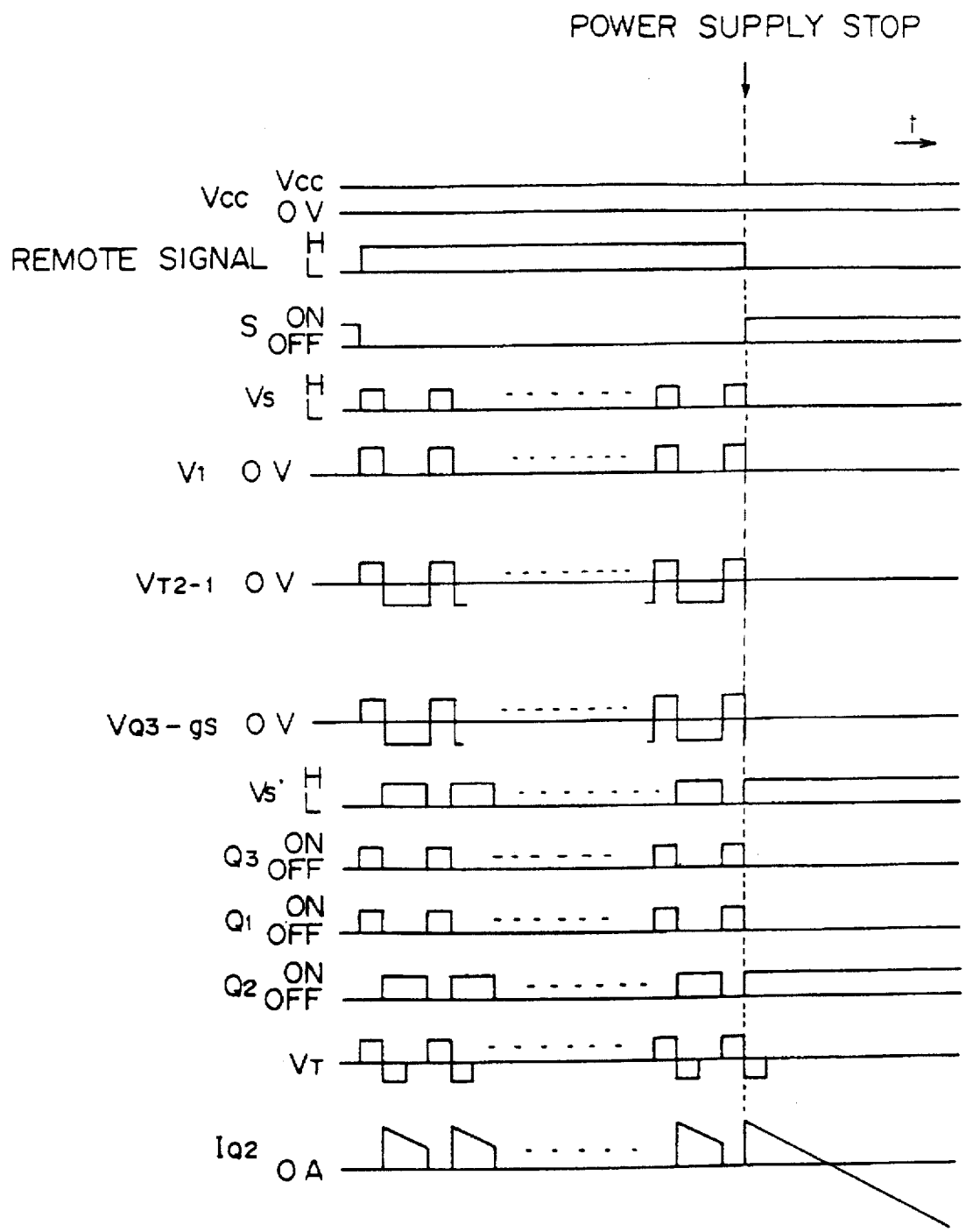
FIG. 3 shows waveforms of operations performed by each unit when the power is down, according to the conventional technique.
Figure 4:
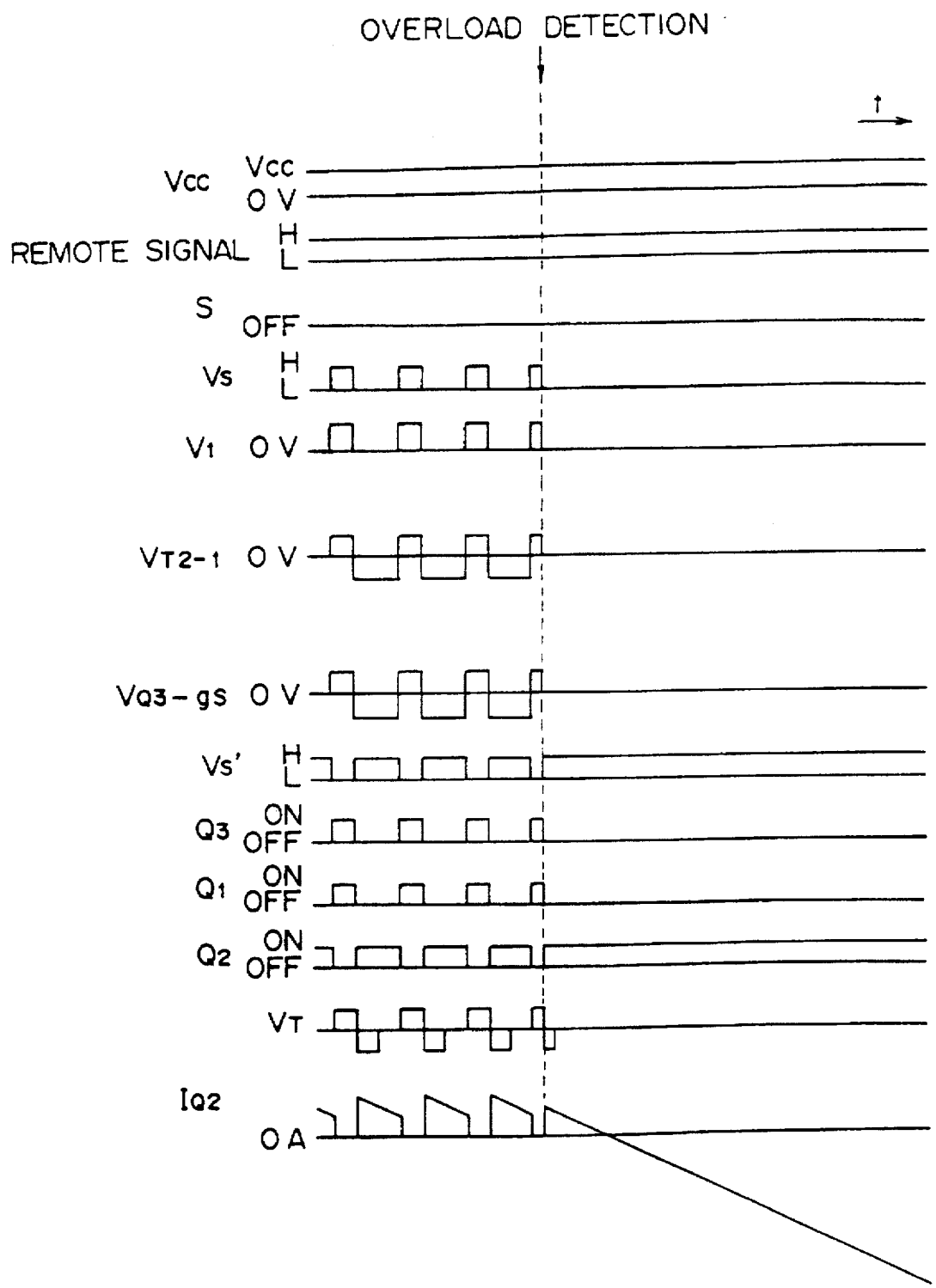
FIG. 4 shows waveforms of operations performed by each unit according to the conventional technique, when an overload is imposed.

As an example of the detection of the overload state or the state in which a power supply is stopped, according to the output voltage of the DC-DC converter, a state in which a reverse overcurrent $I_{Q2}$ can flow through the flywheel switch Q2 as shown in FIGS. 3 and 4, can be cited. This state is detected by the state detecting unit 3. This detection is not always made by measuring the value of the electric current $I_{Q2}$. It can be implemented by the output voltage of the DC-DC converter, remote signal, and the detection of an output on the secondary side of the main transformer T1. Since the state detecting unit 3 provides the control instruction signal to the control unit 4 based on this detection, the control unit 4 can turn off the flywheel switch Q2.

Specifically, the control unit 4 forcibly drives a voltage Vs' which remains high, low, according to the control instruction signal from the state detecting unit 3, so that the low level voltage is applied to the gate of the flywheel switch Q2, and the flywheel switch Q2 is turned off.

Figure 1:
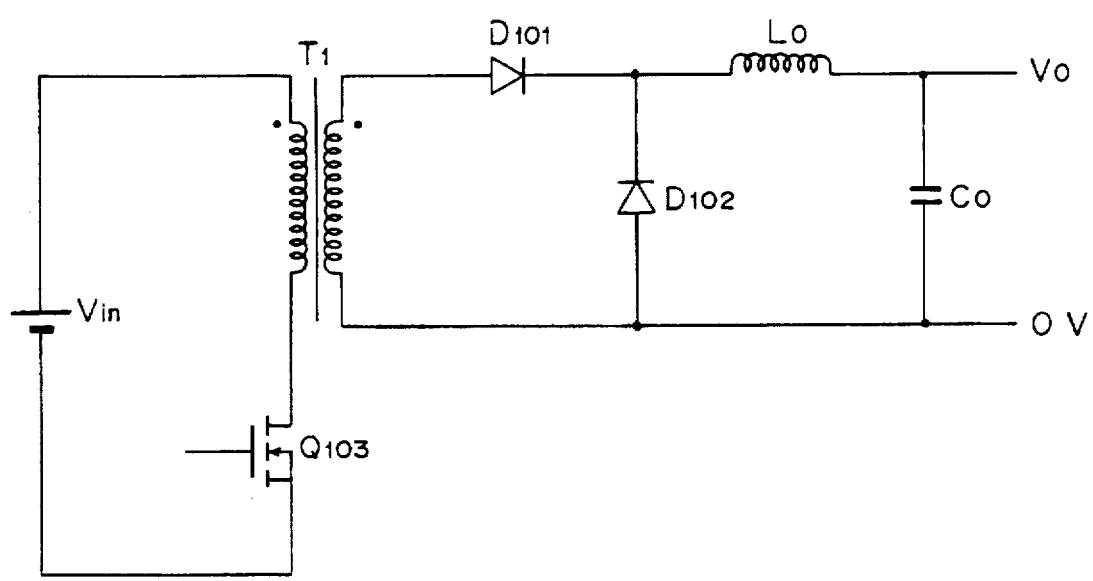
FIG. 1 is a circuit diagram showing the configuration of a conventional technique.
Figure 2:
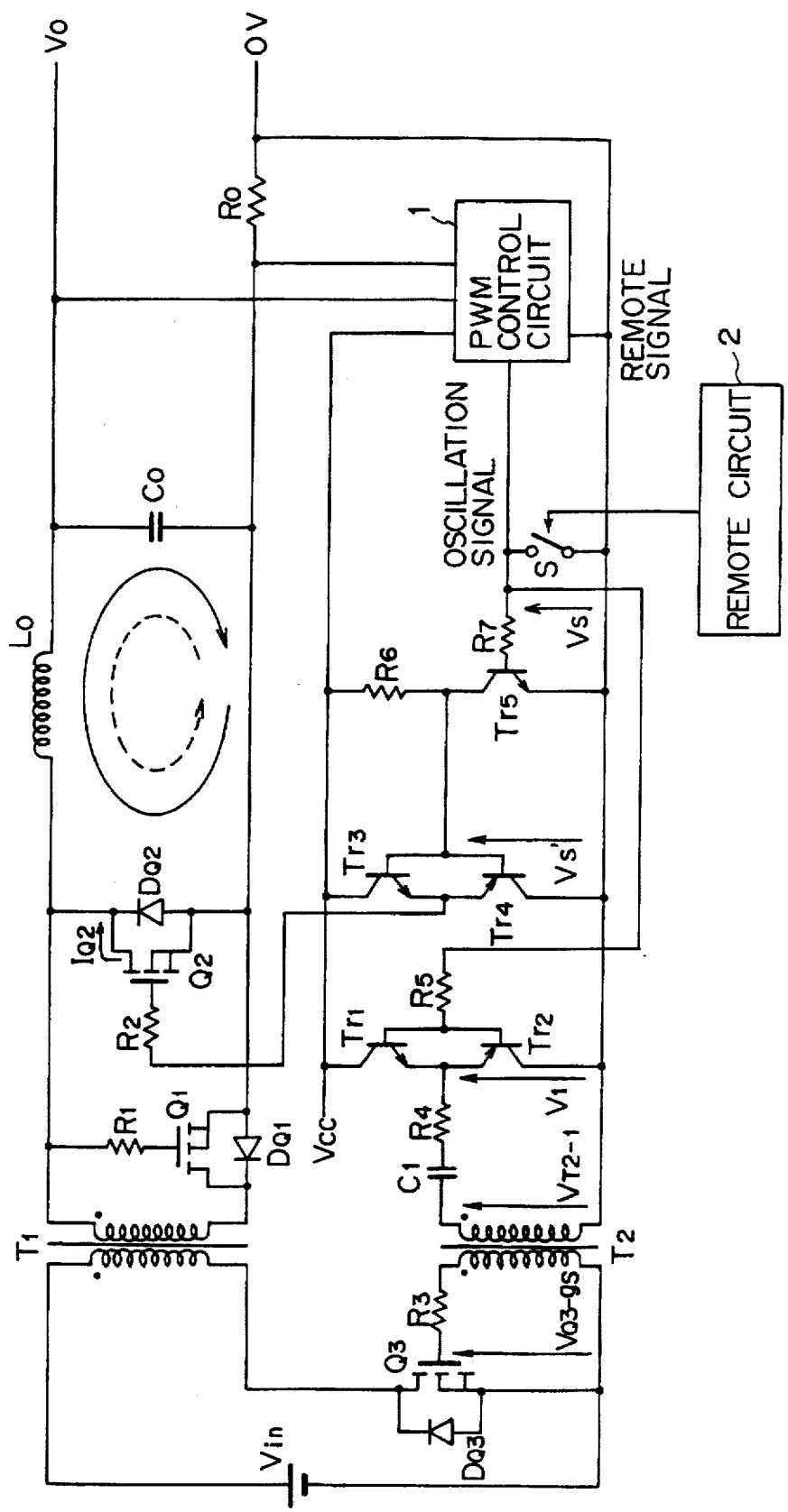
FIG. 2 is a circuit diagram showing details of the configuration of the conventional technique.

Because the flywheel switch Q2 is turned off when a power supply is stopped or when an overload is imposed as shown in FIGS. 3 and 4, the reverse electric current path shown in FIG. 2, which is composed of the flywheel switch Q2, inductance Lo, and smoothing capacitor Co, and formed until that time, is shut off. In this way, the electric charge made to the output capacitor such as the smoothing capacitor Co can be prevented from flowing in the reverse electric current path. Accordingly, the flywheel switch Q2 can be prevented from being destroyed due to a flow of a reverse overcurrent, even if the capacitance of the output capacitor is large.

Figure 6:
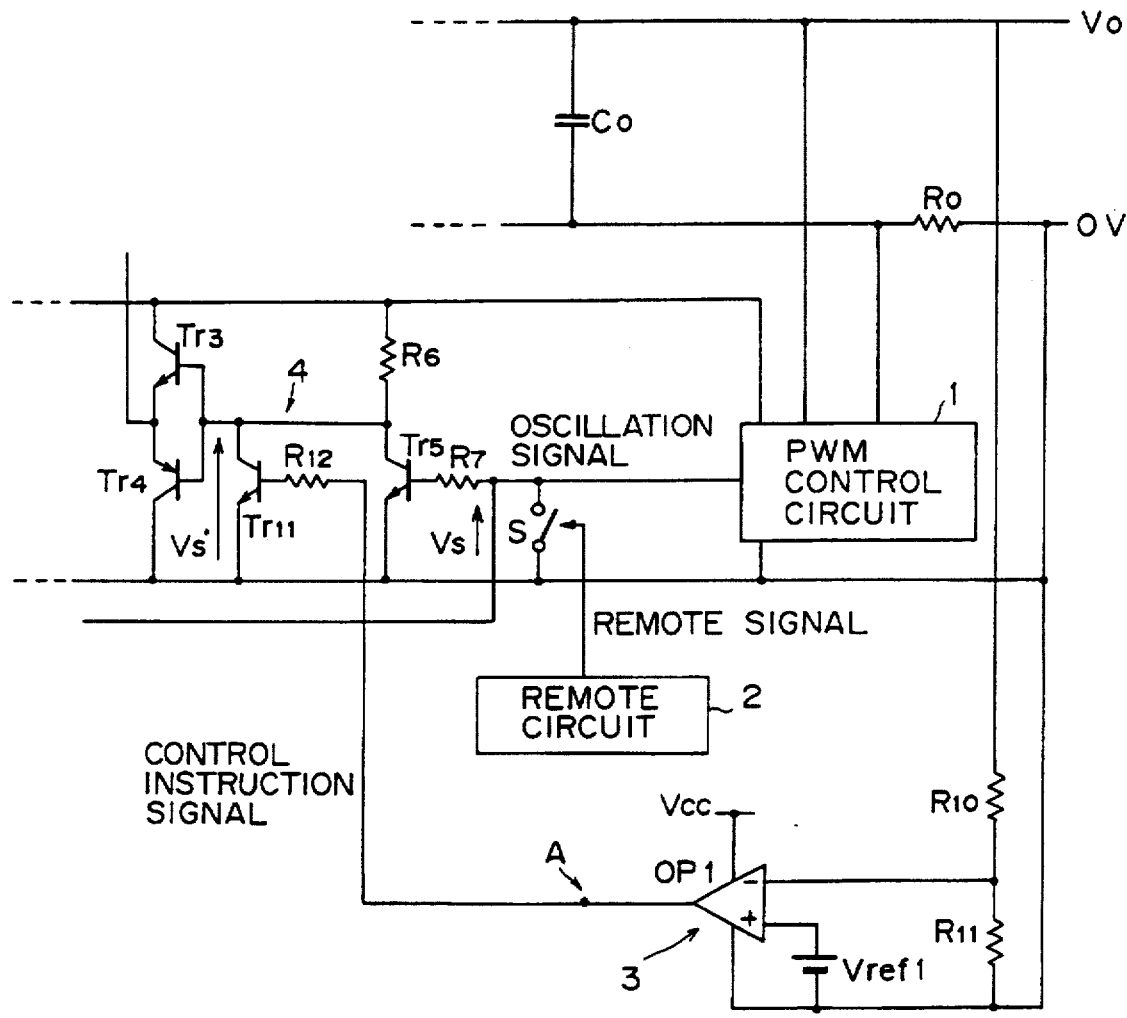
FIG. 6 is a circuit diagram showing the core parts of a first embodiment according to the present invention.

FIG. 6 is a circuit diagram showing the core parts of the configuration of a DC-DC converter. This figure shows a first embodiment of the state detecting unit 3 and the control unit 4 included in the DC-DC converter, which are explained by referring to FIG. 5, according to the present invention.

Provided first is the explanation about the outline of the DC-DC converter by referring to FIG. 5, prior to the detailed explanation about the embodiment shown in FIG. 6. The DC-DC converter shown in FIG. 5 converts the high voltage Vin input to the primary side of the main transformer T1 in order to output the low voltage Vo to the secondary side. The low voltage Vo is provided to a load such as a computer, as a stable power supply. Accordingly, the DC-DC converter according to the present invention is basically a forward converter which transmits energy from the primary side of the main transformer T1 to its secondary side, while the main switch Q3 is turned on.

On the primary side of the main transformer T1, the main switch Q3 implemented by an n-channel MOSFET is serially connected to a low voltage side of the main transformer T1 circuit, and a driving signal output from the driving circuit composed of the transistors Tr1 and Tr2 is input to a gate of the main switch Q3 via the drive transformer T2, etc. A diode $D_{Q3}$ is a parasitic diode of the main switch Q3. On the secondary side of the main transformer T1, the rectification switch Q1 implemented by an n-channel MOSFET, is serially connected to the low voltage side of the main transformer T1 circuit, while the flywheel switch Q2 implemented by the n-channel MOSFET is connected to the main transformer T1 in parallel. A driving signal from the driving circuit composed of the flywheel switch Q2, etc., is input to a gate of the rectification switch Q1, while a driving signal from the driving circuit composed of the transistors Tr3 and Tr4, etc., is input to a gate of the flywheel switch Q2. The diodes $D_{Q1}$ and $D_{Q2}$ are respectively parasitic diodes of the rectification switch Q1 and the flywheel switch Q2.

Accordingly, the diode $D_{Q2}$ is connected to the flywheel switch Q2 on the secondary side of the main transformer T1 in parallel by configuring the flywheel switch Q2 using the MOSFET, without adding an actual diode separately from the flywheel switch Q2. The parasitic diode $D_{Q2}$ forms an electric current path from the low voltage (reference voltage of the circuitry) side to the high voltage side. Arrangement of the diode $D_{Q2}$ in parallel to the flywheel switch Q2 prevents the rectification switch Q1 from being destroyed due to an extremely high voltage caused by shutting off the path of the electric current $I_{Q2}$ flowing through the flywheel switch Q2, when it is turned off. That is, the existence of the parallel diode ensures an electric current path for the electric current $I_{Q2}$ which flows through the flywheel switch Q2 to flow in a forward direction of the parallel diode (parasitic diode $D_{Q2}$), when the flywheel switch Q2 is turned off. Suppressing a high voltage caused by turning off the flywheel switch Q2 can prevent the rectification switch Q1 from being destroyed. Such prevention can be implemented at a conventional timing at which an oscillation signal from the PWM control circuit 1 turns off the flywheel switch Q2, and also at a timing at which a control instruction signal from the state detecting unit 3 of the present invention turns off the flywheel switch Q2, in the same manner. That is, the number of circuit elements and corresponding mounting space can be reduced by using the parasitic diode $D_{Q2}$ of a corresponding switch element as a parallel diode, thereby downsizing the DC-DC converter.

If the flywheel switch Q2 is implemented by a switch element other than a MOSFET, a parasitic diode cannot be used. Accordingly, an additional diode must be added and connected to the switch element. Since the flywheel switch Q2 is also arranged in parallel in this case, the voltage drop and power consumption of the additional diode can be ignored. The diode can be therefore implemented by a pn junction diode or a Schottky barrier diode.

The PWM control circuit 1 controls the rectification switch Q1 and the main switch Q3 via the above described driving circuit, and can alternately switch between the main switch Q3 and the rectification switch Q1, and the flywheel switch Q2 at a high frequency. To perform the above operations, the PWM control circuit 1 outputs an oscillation signal whose level is driven high or low in turn, from its oscillation signal terminal. The voltage of the oscillation signal of the PWM control circuit 1, that is a voltage at an input end of a resistor R7 is represented as Vs.

The PWM control circuit 1 includes a capability for detecting a flow of a current (overcurrent) which is higher than an output current, such as a rated current, whose value is equal to or larger than a predetermined value, in order to monitor an output current from the DC-DC converter, and to protect the DC-DC converter itself and a device connected with the DC-DC converter which is the load from the overcurrent. For such protection, the PWM control circuit 1 is connected to a terminal on a ground voltage side of an output voltage of the DC-DC converter, on the main transformer T1 side prior to an output resistor Ro, in order to detect an electric current flowing through the terminal. The PWM control circuit 1 properly controls the value of the output current to the load by controlling the oscillation signal according to the detected value of the electric current, controlling the turning on/off of a duty cycle of the DC-DC converter based on the control of the oscillation signal, and keeping the output voltage constant. The overcurrent state in which the value of the output current becomes larger than a predetermined value, occurs, for example, if the connected device is overloaded and uses too high a load current, if a short-circuit occurs inside of the connected device, or if an inadvertent short-circuit occurs between the output terminals of the DC-DC converter.

If an overcurrent does not flow, the PWM control circuit 1 does not perform the control based on the detection of an overcurrent. At this time, the duty factor of the oscillation signal output from the PWM control circuit 1 is set to a normal value, and the output voltage Vo of the DC-DC converter is set in order to maintain a predetermined voltage. If the overcurrent flows, the PWM control circuit 1 performs the control based on the detection of an overcurrent. The PWM control circuit 1 sets the duty factor of the oscillation signal to a value which makes the off duration longer. Therefore, an amount of energy transmitted from the primary side to the secondary side is reduced, and the output voltage Vo of the DC-DC converter drops as the on-duty of the oscillation signal from the PWM control circuit becomes lower. Consequently, an operation at a rated current can be performed.

The PWM control circuit 1 comprises the capability for detecting the value of the output voltage Vo, and monitors a voltage output from the DC-DC converter, in order to maintain the output voltage Vo at a predetermined value. For such control operations, the PWM control circuit 1 is connected with an output terminal of the DC-DC converter to detect the output voltage Vo, controls an oscillation signal according to the detected value of the output voltage Vo, controls an output from the DC-DC converter based on the oscillation signal, and controls a voltage value applied to a load.

If the output voltage Vo is higher than a predetermined voltage, the PWM control circuit 1 slightly decreases both the on-duty factor of the oscillation signal and the value of the output voltage, in order to maintain the predetermined voltage. If the output voltage Vo is lower than the predetermined voltage, the PWM control circuit 1 slightly increases both the on-duty factor of the oscillation signal and the value of the output voltage Vo of the DC-DC converter, in order to maintain the predetermined voltage.

The driving circuit of the flywheel switch Q2 is composed of resistors R2, R6, and R7, and transistors Tr3, Tr4, and Tr5, as shown in FIG. 5. A serial circuit composed of the resistor R6 and the npn transistor Tr5, and a serial circuit composed of the npn transistor Tr3 and the pnp transistor Tr4 are connected between the power supply voltage (such as Vcc) and a reference voltage (such as 0V). An oscillation signal from the PWM control circuit 1 is input to the base of the transistor Tr5 via the resistor R7. An output from a collector of the transistor Tr5 is input to the bases of the transistors Tr3 and TR4 as an input to the serial circuit composed of these transistors. In the meantime, an emitter output of the serial circuit composed of the transistors Tr3 and Tr4 is input to the gate of the flywheel switch Q2 via the resistor R2. Accordingly, the serial circuit composed of the transistors Tr3 and Tr4 is a direct driving circuit of the flywheel switch Q2.

Since the control unit 4 is intended to control a flywheel switch, it is included in the driving circuit of the flywheel switch Q2, as shown in FIG. 5. Therefore, the control unit 4 drives the flywheel switch not directly, but by controlling the driving circuit which controls the on/off operation of the flywheel switch Q2.

The driving circuit of the main switch Q3 is composed of the resistors R3, R4, and R5, transistors Tr1 and Tr2, capacitor C1, and drive transformer T2. The transistors Tr1 and Tr2 are connected between the power supply voltage of the circuit and its reference voltage, as a serial circuit composed of the npn transistor Tr1 and the pnp transistor Tr2, in the same manner as the combination of the transistors Tr3 and Tr4 forming the driving circuit of the flywheel switch Q2. The oscillation signal from the PWM control circuit 1 is input to the bases of the transistors Tr1 and Tr2 via the resistor R5, as an input of the serial circuit composed of these transistors. An emitter output from the serial circuit composed of the transistors Tr1 and Tr2 is input to the primary side of the drive transformer T2 via the serial circuit composed of the resistor R4 and the capacitor C1. The secondary side of the drive transformer T2 is connected to the gate of the main switch Q3 via the resistor R3. Accordingly, the serial circuit composed of the transistors Tr1 and Tr2 is a direct driving circuit of the main switch Q3.

The driving circuit of the rectification switch Q1 is composed of the flywheel switch Q2 as shown in FIG. 5. A drain of the flywheel switch Q2 is connected to the gate of the rectification switch Q1 via the resistor R1. Accordingly, the rectification switch Q1 is considered to be directly driven by an output signal from the flywheel switch Q2. That is, the rectification switch Q1 is considered to be driven by a signal generated by inverting a driving signal input to the gate of the flywheel switch Q2.

To externally control the DC-DC converter, the switch S is inserted between an oscillation signal terminal of the PWM control circuit 1 and the reference voltage of the circuitry. Turning on/off of the switch S is controlled based on a remote signal output from the remote circuit 2.

The remote circuit 2 outputs a remote signal for controlling an oscillation output from the PWM control circuit 1. That is, oscillation of the DC-DC converter is controlled by turning on/off of the switch S according to the remote signal, so that an output from the converter is controlled. To stop a power supply according to an external control, the off state (low level) is transmitted to turn the switch S on according to the remote signal from the remote circuit 2, which is, for example, manually input by maintenance staff, so that the power supply to a load is stopped.

If the remote signal is high, the switch S is turned off to enable the oscillation signal from the PWM control circuit 1. If the remote signal is low, the switch S is turned on to disable the oscillation signal from the PWM control circuit 1. Since the oscillation signal is enabled on the condition that the remote signal is high, each of the switches Q1, Q2, Q3, etc. is turned on/off. Accordingly, the output voltage Vo of the DC-DC converter becomes a value depending on the duty factor of the oscillation signal from the PWM control circuit 1. In the meantime, if the remote signal is low, the switch S is turned on to make the oscillation signal inactive. With the remote signal low, and the switch S turned on to disable the oscillation signal, the flywheel switch Q2 is turned on, while the rectification switch Q1 and the main switch Q3 are turned off. Because the rectification switch Q1, which is in series with the main switch Q3 and the main transformer T1, is turned off, a supply from the power source is stopped, and the output voltage Vo results in 0V.

In FIG. 6, the state detecting unit 3 is implemented by an output voltage detecting unit composed of resistors R10 and R11, operational amplifier OP1, and a reference voltage source Vref1. The voltage dividing resistors R10 and R11 are serially connected between the output voltage Vo and the ground voltage 0V, so that an intermediate voltage generated by splitting the output voltage Vo is input to one of terminals (inverting input terminal) of the operational amplifier OP1. In the meantime, the reference voltage Vref1 is input to the other of the terminals (non-inverting terminal). The reference voltage Vref1 is a value which can be predetermined among values lower than the output voltage Vo and larger than the value of the ground voltage 0V. The closer the value is to the ground voltage 0V, the better. Normally, it is set to a value between 20% to 30% of the output voltage Vo. Assuming that the output voltage Vo is 5V, Vref1 is set to a value of approximately 1V. If an intermediate voltage between the resistors R10 and R11, which is input to the inversion input terminal of the operational amplifier OP1, is lower than the reference voltage Vref1, the operational amplifier OP1 outputs a control instruction signal of a high level.

Figure 7:
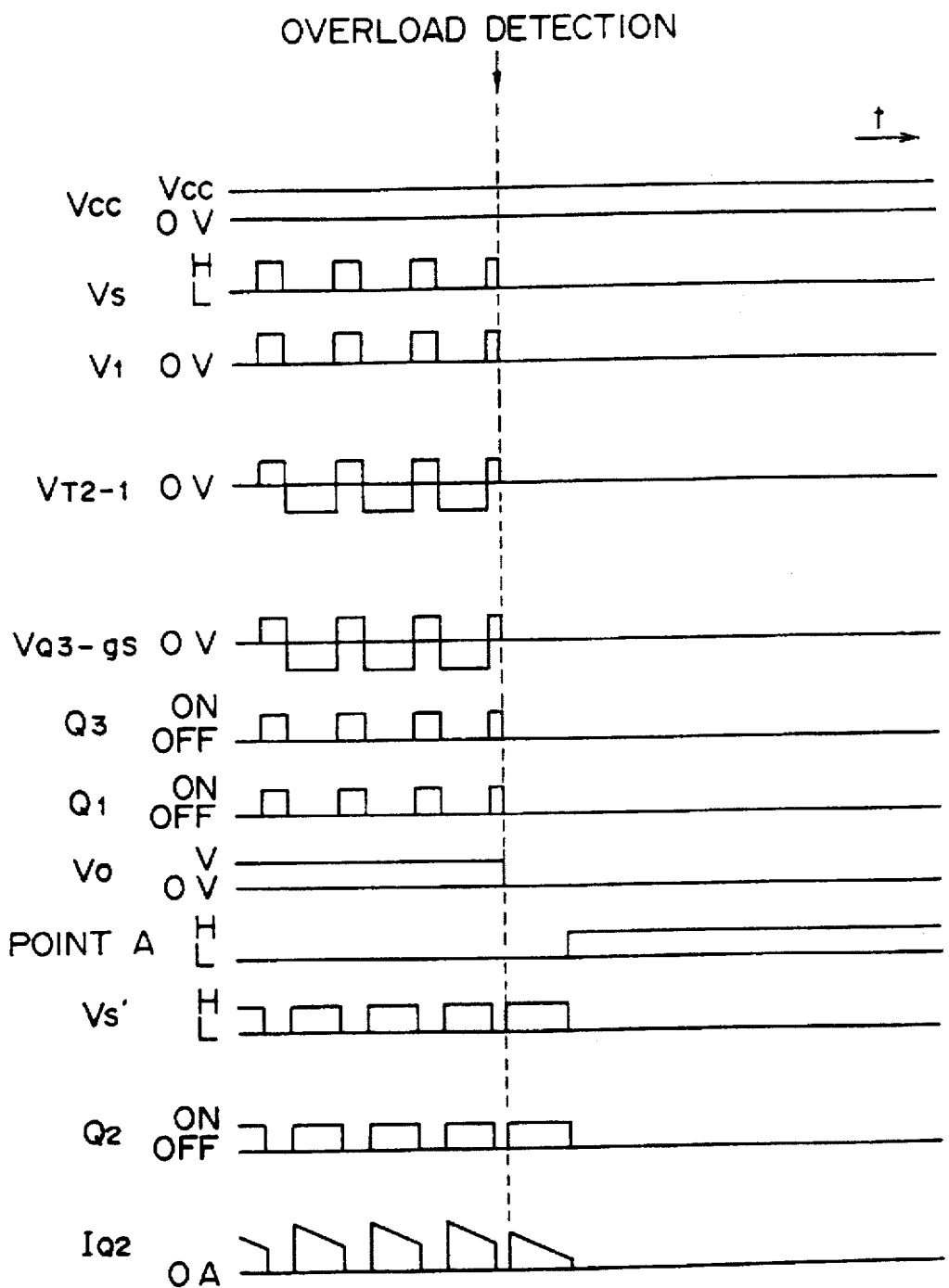
FIG. 7 shows waveforms of operations performed by each unit when being overloaded in the first embodiment according to the present invention.

If the intermediate voltage between the resistors R10 and R11 is higher than the reference voltage Vref1, the operational amplifier OP1 outputs a control instruction signal of a low level. FIG. 7 shows an output from the operational amplifier OP1, as a voltage at a point A.

As described above, the state detecting unit 3 detects the state in which the output voltage Vo of the DC-DC converter is lower than the reference voltage Vref1, outputs a control instruction signal according to the result of this detection, and supplies the control instruction signal to the control unit 4. Since this state occurs, for example, on the condition that a device connected to the DC-DC converter is overloaded, etc., an overload state can be detected by detecting that state.

The control unit 4 is composed of a switching element Tr11 whose on/off state is controlled by an output from the state detecting unit 3, and its input resistor R12. The switching element Tr11 is a switching element which is connected in parallel to the transistor Tr5 which is driven by an oscillation signal output from the PWM control circuit, and the base of Tr11, receives a control instruction signal from the state detection unit 3.

An output from the state detecting unit 3 is input to the base of the transistor Tr11 via the resistor R12. If the control instruction signal of high level is input, the transistor Tr11 is turned on. As a result, the input voltage (Vs') of the transistors Tr3 and Tr4 is forcibly driven low, which is the reference voltage (0V) of the circuit. Therefore, an output from the serial circuit composed of the transistors Tr3 and Tr4 is driven low because the transistor Tr4 is turned on, and the flywheel switch Q2 is turned off. If the control instruction signal is not input, it is recognized as the low level. Accordingly, the transistor Tr11 is turned off, and the output voltage of the transistor Tr5 is input to the transistors Tr3 and Tr4 unchanged. The flywheel switch Q2 is therefore driven by an oscillation signal from the PWM control circuit 1 via the driving circuit composed of the transistors Tr3, Tr4, etc.

As described above, the control unit 4 controls the state of the serial circuit composed of the transistors Tr3 and Tr4 of the driving circuit controlling the on/off operation of the flywheel switch Q2. That is, if the control instruction high signal from the state detecting unit 3 is input, the control unit 4 controls the driving circuit of the flywheel switch Q2 so that the flywheel switch Q2 is turned off. The output voltage of the transistor Tr11, that is, the output voltage of the control unit 4, is represented as Vs'.

The control unit 4 is not limited to the configuration composed of the transistor Tr11, etc. The control unit 4 may be configured arbitrarily so long as it controls the on/off state of the flywheel switch Q2, based on the oscillation signal output from the PWM control circuit 1 and the control instruction signal from the state detecting unit 3. That is, the control unit 4 must be a unit for turning off the flywheel switch by controlling the driving circuit, when the control instruction high signal from the state detecting unit 3 is input. The same can be said of the DC-DC converter shown in FIGS. 8 and 10, to be described later.

FIG. 7 shows waveforms of operations when the DC-DC converter shown in FIG. 6 is overloaded. FIG. 7 is very similar to FIG. 4. The DC-DC converter running properly is shown on the left-hand side of FIG. 7. That is, the flywheel switch Q2, etc. are driven by an oscillation signal output from the PWM control circuit 1 at a high frequency. The main switch Q3 and the rectification switch Q1, and the flywheel switch Q2 are alternately turned on/off as shown in FIG. 7. Accordingly, the value of the output voltage Vo of the DC-DC converter is normal and remains constant in this state, as shown in this figure. Furthermore, the waveform of the electric current $I_{Q2}$ flowing through the flywheel switch Q2 becomes a chopper waveform, and a reverse current does not flow.

Since the output voltage Vo is a normal value at this time, the output from the state detecting unit 3 (voltage at the point A) is low as shown in this figure, and the control instruction signal is not output. Accordingly, the transistor Tr11 is turned off, and the flywheel switch Q2 is driven by an oscillation signal output from the PWM control circuit 1.

If an overload state, that is, a state in which an overcurrent flows, occurs due to an excess load current and a short-circuit on the load side, etc., the PWM control circuit 1 which detects this state drives a corresponding oscillation signal (voltage Vs shown in FIG. 6) low in order to decrease the on-duty ratio for a long period. The transistor Tr5 is turned off due to the low level of the voltage Vs, and the voltage Vs' shown in FIG. 6 becomes high as shown after the dotted line indicating the time of an overload detection in FIG. 7. As a result, an output from the driving circuit of the flywheel switch Q2 composed of the transistors Tr3 and Tr4 is driven high, and the flywheel switch Q2 is turned on. In the meantime, the rectification switch Q1 and the main switch Q3 are turned off due to the low level of the voltage Vs.

Because the voltage Vs remains low for a long period in this state, the flywheel switch Q2 remains on due to the high level of the voltage Vs', and the rectification switch Q1 and the main switch Q3 remain off. Accordingly, the electric current $I_{Q2}$ running through the flywheel switch Q2 flows in a forward direction (as indicated by the solid line arrow in FIG. 2) for a time. The duration during which the electric current $I_{Q2}$ flows in the forward direction is longer than that of a normal operation, as shown in FIG. 7.

At this time, an electric current path composed of the flywheel switch Q2, inductance Lo, and output capacitor Co is formed because the flywheel switch Q2 is on. However, an electric current path composed of the main transformer T1, etc. is not formed because the rectification switch Q1 is off. Although the electric current path composed of the flywheel switch Q2, etc. is a bidirectional current path, a reverse current does not flow at that time.

When a strong current flows due to an overload state as if a load were short-circuited, the output voltage of the DC-DC converter drops to 0V, which is then input to the inversion terminal of the operational amplifier OP1 via the resistor R10. As a result, the output from the operational amplifier Op1 (voltage at the point A) is driven high with some delay from a point in time at which the overcurrent is detected as shown in this figure, and the control instruction high signal is output. The transistor Tr11 is turned on according to this signal, and the voltage Vs' is forcibly driven low. Consequently, the flywheel switch Q2 is turned off.

At this time, the parasitic diode $D_{Q2}$ makes the electric current $I_{Q2}$ running through the flywheel switch Q2 flow in the forward direction of the parasitic diode $D_{Q2}$ itself, when the flywheel switch Q2 is turned off as described above. Therefore, a high voltage caused by turning off the flywheel switch Q2 can be avoided, and the rectification switch Q1 can be prevented from being destroyed. The same thing can be said of the second embodiment shown in FIGS. 8 and 9, and the third embodiment shown in FIGS. 10 and 11.

The reverse electric current path composed of the flywheel switch Q2, etc. (refer to FIG. 2), is shut off because the flywheel switch Q2 is turned off, in this state. A timing at which the voltage at a point A is driven high may be one prior to destruction of the flywheel switch Q2 due to the reverse current (indicated by the dotted line arrow in FIG. 2). The actual timing is a timing prior to the beginning of a reverse current flow into an electric current path composed of the flywheel switch Q2, etc., as shown in FIG. 7. Since both a timing at which the output voltage Vo (=0V) is input to the operational amplifier OP1 and the timing at which the reverse current begins to flow are determined by a circuit constant, they can be accurately predetermined. In this way, the reverse current can be prevented from flowing from the output capacitor Co into the flywheel switch Q2 at the time of overloading. Accordingly, even if the capacitance of the output capacitor Co is large, the flywheel switch Q2 can be prevented from being destroyed by a reverse overcurrent.

The output voltage Vo is recovered as follows. If the overload state, that is, the state in which an overcurrent flows, is resolved by changing a load setting or fixing a problem on the load side, the PWM control circuit 1 which detects this state drives an oscillation signal (voltage Vs) high for a long period, in order to increase the on-duty factor. The rectification switch Q1 and the main switch Q3 are turned on due to the high level of the voltage Vs, while the flywheel switch Q2 remains off. If the value of the output voltage Vo is higher than a predetermined value due to the on state of the main switch Q3 after that, the output (voltage at the point A) of the state detecting unit 3 is inverted, and a control instruction signal is not generated. Accordingly, the flywheel switch Q2 becomes in a state in which it is driven by the output of the transistor Tr5. Thereafter, the rectification switch Q1 and the main switch Q3, and the flywheel switch Q2 are alternately turned on/off, thereby keeping the value of the output voltage Vo constant.

Figure 8:
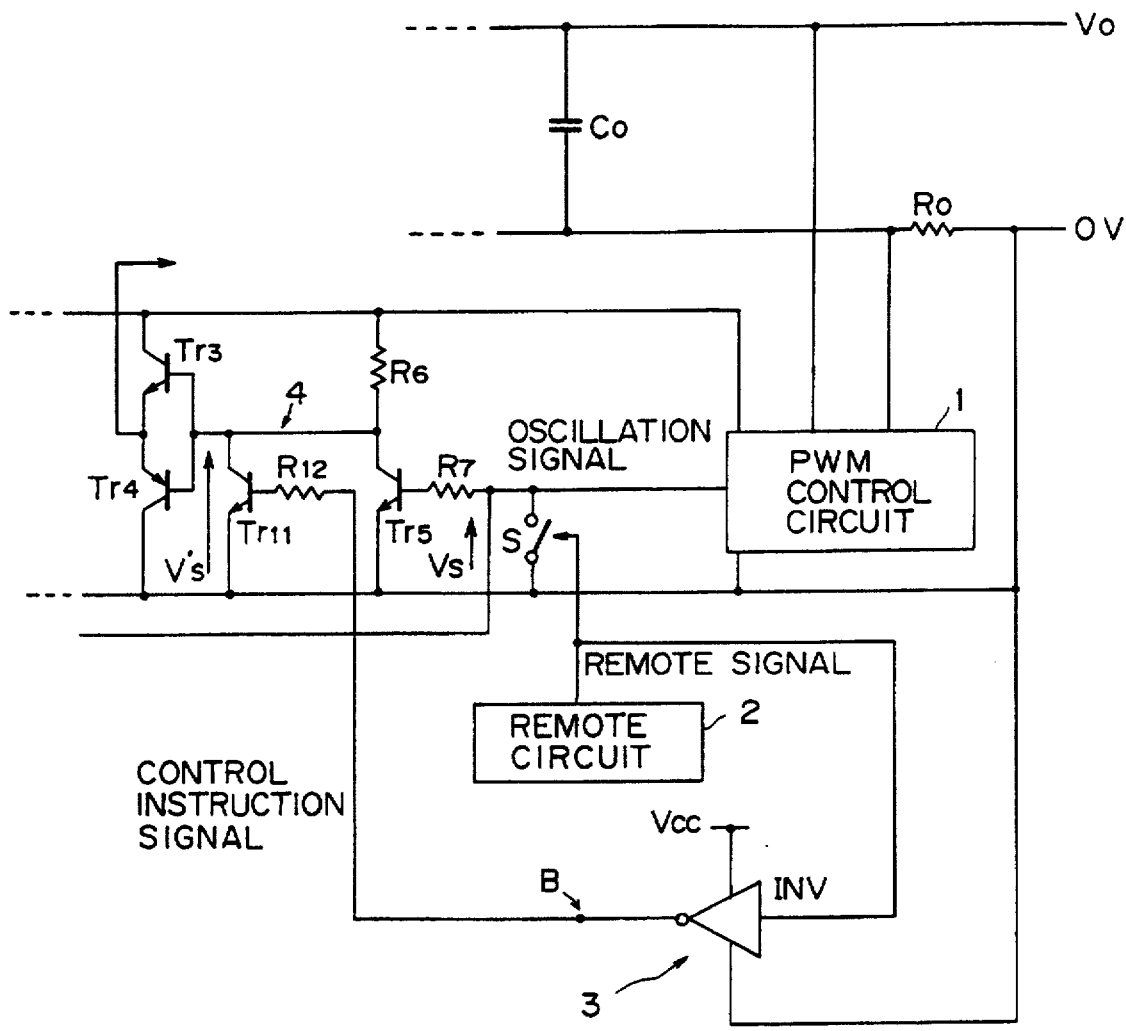
FIG. 8 is a circuit diagram showing the core parts of a second embodiment of the present invention.

FIG. 8 is a circuit diagram showing the core parts of the DC-DC converter. This figure, in addition to FIG. 5, shows the detailed configuration of the DC-DC converter according to the present invention.

In FIG. 8, the state detecting unit 3 is implemented by a remote signal detecting unit for detecting a remote signal from the remote circuit 2. The remote signal detecting unit is composed of an inverter INV. The inverter INV is provided with a remote signal from the remote circuit 2 as an input, and outputs its inverted signal. An output voltage from the inverter INV is represented as a voltage at the point B.

As described above, the switch S is turned off to enable an oscillation signal from the PWM control circuit 1, if the remote signal is high. If the remote signal is low, the switch S is turned on to drive the oscillation signal from the PWM control circuit 1 low. Accordingly, the output voltage Vo of the DC-DC converter results in 0V.

If the remote signal is high in the state detecting unit 3, a control instruction signal is not generated. If the remote signal is low, the output from the inverter INV is driven high to generate the control instruction signal.

As described above, the state detecting unit 3 detects the state in which the remote signal of the low level is output, generates the control instruction signal for the control unit 4 based on the detected state, and provides it to the control circuit 4. The remote signal is driven low when a power supply to a load is stopped. Accordingly, the state in which the power supply to the load is stopped can be detected by detecting the state in which the remote signal is low.

The configuration of the control unit 4 shown in FIG. 8 is similar to that of the control unit 4 shown in FIG. 6. Accordingly, if a control instruction signal of a high level is input, the input voltage (voltage Vs') to the transistors Tr3 and Tr4 is forcibly driven low. As a result, an output from the serial circuit composed of the transistors Tr3 and Tr4 becomes low, which turns off the flywheel switch Q2.

If the control instruction signal is not input (it is recognized as the low level), the transistor Tr11 is turned off. As a result, the output from the transistor Tr5 is input to the transistors Tr3 and Tr4 unchanged. Accordingly, the flywheel switch Q2 is driven by an oscillation signal from the PWM control circuit 1 via the driving circuit composed of the transistors Tr3 and Tr4, etc.

Figure 9:
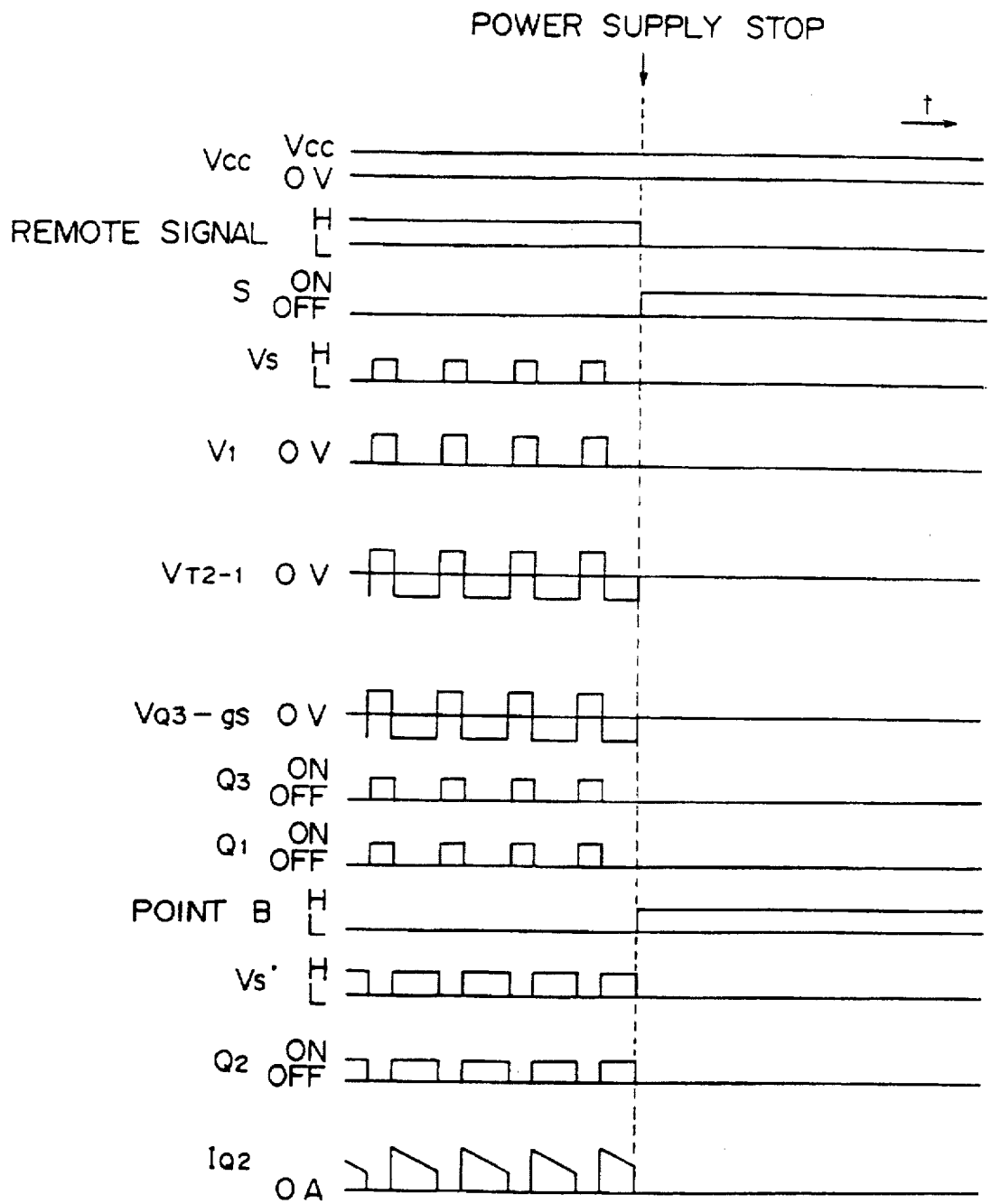
FIG. 9 shows waveforms of operations performed by each unit at the time of stopping a power supply in the second embodiment according to the present invention.

FIG. 9 shows waveforms of operations performed by the DC-DC converter shown in FIG. 8, when a power supply is stopped. This figure is very similar to FIG. 3. The DC-DC converter running properly is shown on the left-hand side of this figure. Accordingly, the remote signal is driven high, and the switch S is turned off in this state, as shown in this figure. Accordingly, the value of the output voltage Vo is normal and remains constant, although this signal is not shown in this figure, the waveform of the electric current $I_{Q2}$ becomes a chopper waveform, and a reverse current does not flow in this state. Since the remote signal is high at this time, the output from the state detecting unit 3 (voltage at the point B) is low as shown in this figure, and the control instruction signal is not output. As a result, the transistor Tr11 is turned off, and the flywheel switch Q2 is driven by the oscillation signal output from the PWM control circuit 1.

Then, the remote signal is driven low in order to stop a power supply to the load as shown after the dotted line indicating the time of an overload detection in FIG. 9. The switch S is therefore turned on. The voltage Vs is driven low due to the on state of the switch S regardless of the state of the PWM control circuit 1, when the power supply is stopped.

If there is no change to the state of control unit 4, the transistor Tr5 is turned off due to the low level of the voltage Vs, and the voltage Vs' is driven high. Then, the outputs of the transistors Tr3 and Tr4 are driven high, which turns on the flywheel switch Q2. However, the rectification switch Q1 and the main switch Q3 are turned off. The output from the inverter INV, that is, the voltage at the point B is driven high by inputting the low level of the remote signal to the inverter INV as shown in this figure. As a result, a control instruction signal is output, and the transistor Tr11 is turned on. Then, the voltage Vs' is forcibly driven low, and the outputs of the transistors Tr3 and Tr4 are driven low, so that the flywheel switch Q2 is turned off. Because the voltage at the point B is generated by inverting a remote signal with a single inverter INV, there is almost no delay in the timing at which the voltage at the point B changes, from the timing at which the remote signal is driven low (power supply is stopped). In the meantime, the voltage at the point A shown in FIG. 7 is generated via a predetermined time delay circuit. Therefore, the timing at which the voltage at the point A changes is slightly delayed from the timing at which the overcurrent (low level of the voltage Vs) is detected. This delay of the timing occurs in a similar manner as in FIGS. 11 and 12, to which the explanations will be provided later.

In this state, the reverse electric current path composed of the flywheel switch Q2, etc. (refer to FIG. 2), is shut off by turning off the flywheel switch Q2. Accordingly, the flywheel switch Q2 can be turned off at any timing at which the voltage at the point B is driven high.

As described above, a reverse current can be prevented from flowing from the output capacitor Co into the flywheel switch Q2. Accordingly, even if the capacitance of the output capacitor Co is large, the flywheel switch Q2 can be prevented from being destroyed by a reverse overcurrent.

The output voltage Vo is recovered as follows. The remote signal is first driven high in order to provide a power supply to the load, and the switch S is turned off. Since the output (voltage at the point B) from the state detecting unit 3 is inverted, the control instruction signal is not generated. Accordingly, the flywheel switch Q2 is driven by the output from the transistor Tr5. Additionally, the oscillation signal from the PWM control circuit 1 is enabled due to the off state of the switch S, and the rectification switch Q1 and the main switch Q3 are driven by the oscillation signal from the PWM control circuit. Accordingly, the rectification switch Q1 and the main switch Q3, and the flywheel switch Q2 are alternately turned on/off, so that the output voltage Vo maintains a predetermined value.

The DC-DC converter shown in FIG. 6 is one embodiment in which the flywheel switch Q2 is prevented from being destroyed when it is overloaded, while the DC-DC converter shown in FIG. 8 is another embodiment in which the flywheel switch Q2 is prevented from being destroyed when a power supply is stopped. Therefore, the flywheel switch Q2 can be prevented from being destroyed both when it is overloaded and when the power supply is stopped, by using both of the state detecting units 3 shown in FIGS. 6 and 8.

Because the configurations of the control units 4 shown in FIGS. 6 and 8 are the same in this case, the control parts 4 is common. For example, the DC-DC converter is configured by arranging both of the state detecting units 3 shown in FIGS. 6 and 8, making a two-input OR gate circuit receive their outputs, inputting an output of the gate to the base of the transistor Tr11 as a control instruction signal, and using the two-input OR gate circuit as part of the state detecting unit 3.

FIG. 10 is a circuit diagram showing the core parts of the configuration of the DC-DC converter. FIG. 10 in addition to FIG. 5 show the detailed configuration of the DC-DC converter according to the present invention.

The DC-DC converter shown in FIG. 10, which has a relatively simple configuration similar to that shown in FIG. 6, can prevent the flywheel switch Q2 from being destroyed both when it is overloaded and when the power supply to a load is stopped.

In FIG. 10, the state detecting unit 3 is implemented by a main transformer detecting unit for detecting an output voltage on the secondary side of the main transformer T1, which is composed of a rectifying diode D11, resistors R13 and R14, smoothing capacitor C10, and operational amplifier OP2, and a reference voltage Vref2. The resistors R13 and R14, which are voltage dividing resistances, are serially connected between the output voltage on the secondary side of the main transformer T1 and the reference voltage of the circuitry 0V via the rectifying diode D11, and the capacitor C10 is connected to the resistor R14 in parallel. An intermediate voltage obtained by splitting the output voltage Vo using the voltage dividing resistors R13 and R14, is input to one terminal (non-inverting terminal) of the operational amplifier OP2, while the reference voltage Vref2 is input to the other terminal (inverting terminal) of the operational amplifier OP2. The reference voltage Vref2 is a value which can be determined among values smaller than the output voltage Vo and greater than the reference voltage 0V, in a similar manner to the above described reference voltage Vref1. The closer the value is to the reference voltage 0V, the better. Generally, it is set to a value approximately between 20% and 30% of an output voltage. Assuming that the output voltage Vo is 5V, Vref2 is set to a value of approximately 1V.

If the intermediate voltage between the resistors R13 and R14 is higher than the reference voltage Vref2, the output from the operational amplifier OP2 is driven high, and a control instruction signal is not generated. In the meantime, if the intermediate voltage between the resistors R13 and R14 is lower than the reference voltage Vref2, the output from the operational amplifier Op2 is driven low, and the control instruction signal is generated. Note that the output from the operational amplifier OP2 is defined as a voltage at a point C.

As described above, the state detecting unit 3 detects the state in which the output voltage on the secondary side of the main transformer T1 is lower than the reference voltage Vref2, generates a control instruction signal for the control unit 4 depending on the detected state, and provides this signal to the control unit 4. The state in which the output voltage on the secondary side of the main transformer T1 is lower than the reference voltage Vref2, occurs when a power supply is stopped or when an overload is imposed. Therefore, the power supply stop state and the overload state can be detected by detecting the above described state.

The control unit 4 shown in FIG. 10 is implemented by a gate circuit G1. The gate circuit G1 is provided with an output from the transistor Tr5 driven by an oscillation signal output from the PWM control circuit 1 and a control instruction signal output from the state detecting unit 3 to output a signal for controlling the transistors Tr3 and Tr4 in the driving circuit for the flywheel switch Q2. Specifically, the control unit 4 is composed of a two-input AND gate circuit G1, and its output resistor R15. An output from the gate circuit G1 is input to the bases of the transistors Tr3 and Tr4 via the resistor R15. Accordingly, if the control instruction signal of low level is input, the output from the two-input AND gate circuit G1, that is, an input to the transistors Tr3 and Tr4, is forcibly driven low. As a result, an output from the serial circuit composed of the transistors Tr3 and Tr4 is driven low, and the flywheel switch Q2 is turned off. If the control instruction signal is not input, the output from the transistor Tr5 is input to the transistors Tr3 and Tr4, unchanged as an output from the two-input AND gate circuit G1. This is because one of the inputs is at a high level. As a result, the flywheel switch Q2 is driven by the oscillation signal from the PWM control circuit via the driving circuit composed of the transistors Tr3 and Tr4, etc.

Figure 11:
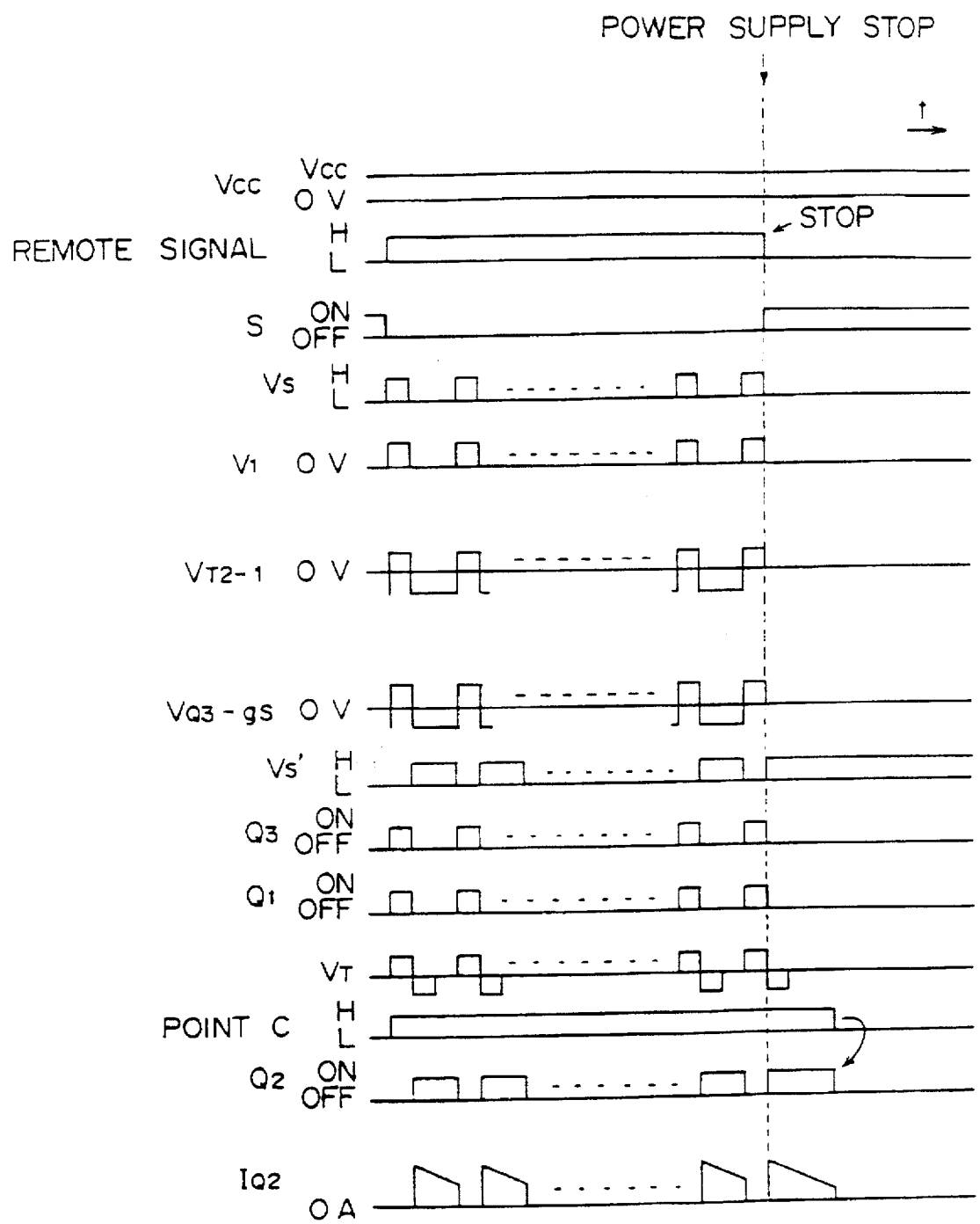
FIG. 11 shows waveforms of operations performed by each unit at the time of stopping a power supply in the third embodiment of the present invention.

FIG. 11 shows waveforms of operations performed by the DC-DC converter shown in FIG. 10, when the power supply to a load is stopped. FIG. 11 is very similar to FIG. 3. The DC-DC converter running properly is shown on the left-hand side of this figure. Accordingly, the remote signal is driven high, and the switch S is turned off in this state, as shown in this figure. The value of the output voltage Vo of the DC-DC converter is normal and maintains constant in this state, although this is not shown in the drawing. The waveform of the electric current $I_{Q2}$ becomes a chopper waveform, and a reverse current does not flow. Since the output voltage Vo is normal at this time, an output from the state detecting unit 3 (voltage at the point C) is high as shown in this figure, and the control instruction signal is not output. Additionally, the two-input AND gate circuit G1 is open, and the flywheel switch Q2 is driven by an oscillation signal from the PWM control circuit 1.

Then, the remote signal is turned off in order to stop a power supply to a load, and the switch S is turned on, as shown on the right-hand side of FIG. 11. When the power supply is stopped, the voltage Vs is driven low by turning on the switch S, regardless of the state of the PWM control circuit 1. Then, the transistor Tr5 is turned off due to the low level of the voltage Vs, and the voltage Vs' remains high as shown on the right-hand side of FIG. 11. Accordingly, the output from the driving circuit of the flywheel switch Q2 composed of the transistors Tr3 and Tr4 remains high. The flywheel switch Q2 is then turned on, while the rectification switch Q1 and the main switch Q3 are turned off. Consequently, the output voltage Vo of the DC-DC converter results in 0V.

Because the voltage Vs' subsequently remains high, the flywheel switch Q2 remains on, and the rectification switch Q1 and the main switch Q3 remain off. Therefore, the electric current $I_{Q2}$ flowing through the flywheel switch Q2 flows in a forward direction for a while (indicated by the solid line arrow in FIG. 2). The duration during which the electric current $I_{Q2}$ flows in the forward direction, is longer than that of a normal operation as shown in this figure. At this time, an electric current path composed of the flywheel switch Q2, inductance Lo, and output capacitor Co is formed by the flywheel switch Q2 being on. A reverse current, however, does not flow at this time.

The reduced value of the output voltage on the secondary side of the main transformer T1 is input to a non-inversion terminal of the operational amplifier OP2 via the resistor R13, etc. with a time delay of a circuit constant. Then, the output from the operational amplifier OP2 (voltage at the point C) is driven low as shown in FIG. 11, and a control instruction signal is output. As a result, the output from the two-input AND gate circuit G1 is forcibly driven low, and the flywheel switch Q2 is turned off.

Figure 12:
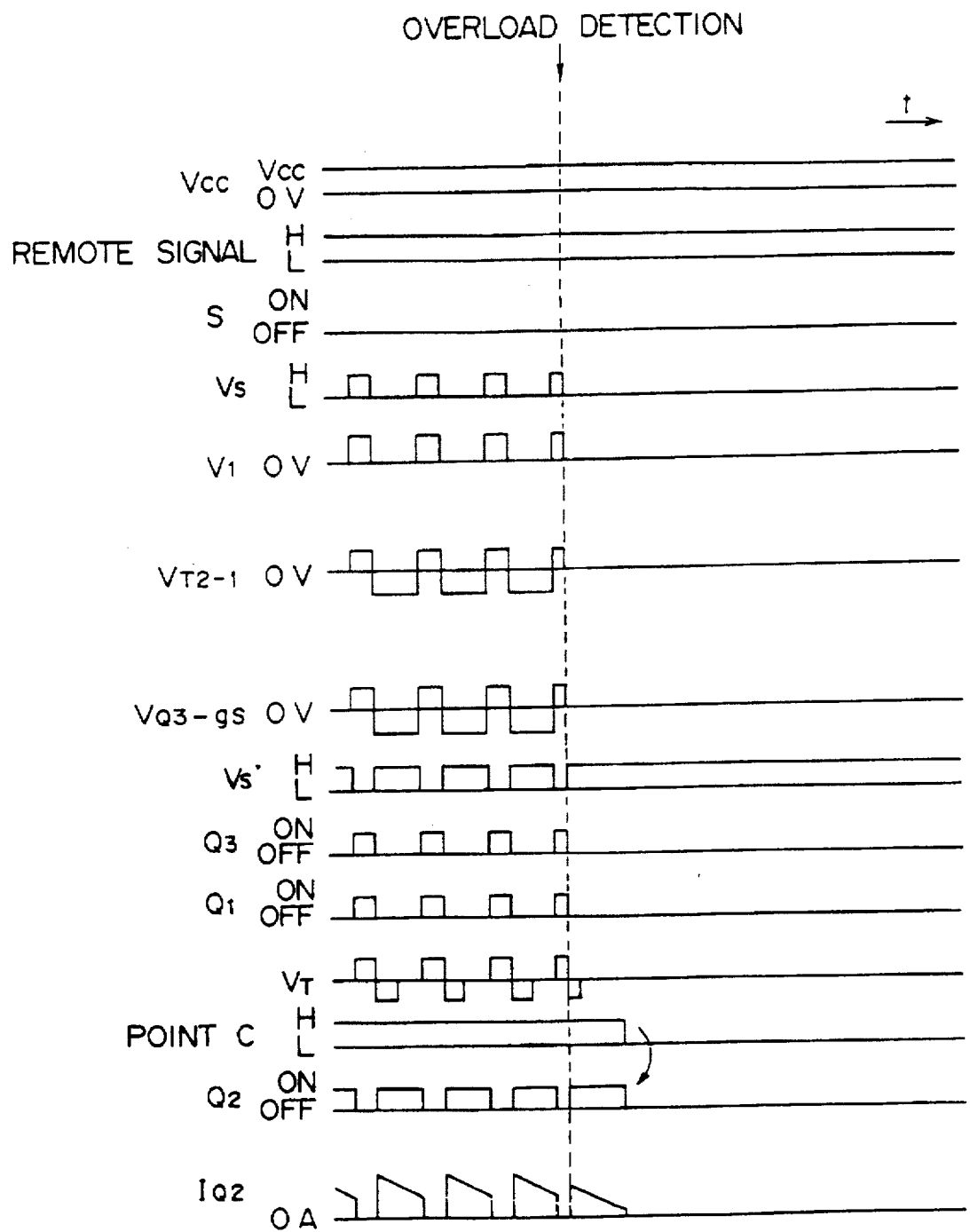
FIG. 12 shows waveforms of operations performed by each unit when being overloaded in the third embodiment of the present invention.

FIG. 12 shows waveforms of operations performed by the DC-DC converter shown in FIG. 10, when it is overloaded. FIG. 12 is very similar to FIG. 4. Similar to FIG. 11, the DC-DC converter running properly is shown on the left-hand side of FIG. 12. The value of the output voltage Vo of the DC-DC converter is normal and remains constant, though it is not shown in this figure. Accordingly, an output from the state detecting unit 3 (voltage at the point C) is high, and a control instruction signal is not output. As a result, the two-input AND gate circuit G1 is open, and the flywheel switch Q2 is driven by an oscillation signal from the PWM control circuit 1.

If an overload state, that is, a state in which an overcurrent flow occurs due to an excessive load current or a short-circuit, as shown in FIG. 12, the PWM control circuit 1 that detects this state drives the corresponding oscillation signal (voltage Vs) low for a long period in order to decrease the on-duty factor. Consequently, the voltage Vs' is driven high, and an output from the driving circuit of the flywheel switch Q2, which is composed of the transistors Tr3 and Tr4, is driven high. Then, as the output from the driving circuit of the flywheel switch Q2 is driven high, and the flywheel switch Q2 is turned on. In the meantime, the rectification switch Q1 and the main switch Q3 are turned off due to the low level of the voltage Vs.

Because the voltage Vs remains low for a long period after that, the voltage Vs' remains high. Accordingly, the flywheel switch Q2 remains on, while the rectification switch Q1 and the main switch Q3 remain off. The electric current $I_{Q2}$ running through the flywheel switch Q2 therefore flows in a forward direction (indicated by the solid line arrow in FIG. 2) for a time, and the duration during which the electric current $I_{Q2}$ flows in the forward direction, is longer than that of a normal operation, as shown in FIG. 12. At this time, an electric current path composed of the flywheel switch Q2, inductance Lo, and an output capacitor Co is formed because the flywheel switch Q2 is turned on.

In the meantime, an electric path composed of the main transformer T1, etc. is not formed because the rectification switch Q1 is turned off. The electric current path composed of the flywheel switch Q2, etc. is a bidirectional current path, but a reverse current does not flow at this time.

If a high electric current flows due to the overload state as if a load were short-circuited, the output voltage Vo of the DC-DC converter drops and results in 0V. The output voltage Vo (=0V) is input to the non-inversion terminal of the operational amplifier OP2 via the resistor R13, etc., with a slight time delay from the time at which the overcurrent is detected. As a result, an output (voltage at the point C) from the operational amplifier OP2 is driven low as shown in FIG. 12, and a control instruction signal is output. Then, an output from the two-input AND gate circuit G1 is forcibly driven low, and the flywheel switch Q2 is turned off. At this time, the electric current path composed of the flywheel switch Q2, etc. is shut off.

As described above, a reverse current can be prevented from flowing from the output capacitor Co into the flywheel switch Q2, both when a power supply to a load is stopped and when an overload is imposed. Accordingly, even if the capacitance of the output capacitor Co is large, the flywheel switch Q2 can be prevented from being destroyed due to a reverse overcurrent. The recovery of the output voltage Vo is similar to that described with reference to FIG. 9, when the power supply is stopped, while it is similar to that described with reference to FIG. 7 when an overload is imposed.

In a DC-DC converter according to the present invention as described above, a state detecting unit for generating a control instruction signal based on a state of the DC-DC converter and a control unit for controlling a flywheel switch, are arranged, so that the DC-DC converter in a predetermined1 state, such as when an overcurrent flows through a flywheel switch, can be detected to generate a control instruction signal, which turns off the flywheel switch. Accordingly, an electric charge applied to an output capacitor can be prevented from flowing into a flywheel switch by shutting off a formed reverse electric current path, when a power supply to a load is stopped, or when an overload is imposed. As a result, the flywheel switch can be prevented from being destroyed due to a reverse current, even if the capacitance of the output capacitor is large.

What is claimed is:

1. A DC-DC converter comprising a main transformer; a main switch connected to a primary side of the main transformer in series; a rectification switch connected to a secondary side of the main transformer in series; a flywheel switch connected to the secondary side of the main transformer in parallel; and a PWM control circuit for outputting an oscillation signal having a duty cycle to maintain a predetermined output voltage by alternately switching between the main switch and the rectification switch, and the flywheel switch via a driving circuit, further comprising:

controlling means for controlling the flywheel switch; and state detecting means for detecting an output from the DC-DC converter, and providing a control instruction signal to said controlling means based on a result of detection, wherein the control instruction signal is generated if the result of detection indicates that an electric current whose value exceeds an allowable value, can possibly flow through the flywheel switch of the DC-DC converter; and said controlling means turns off the flywheel switch if the control instruction signal is input from said state detecting means.

2. The DC-DC converter according to claim 1, wherein
a diode is connected to the flywheel switch in parallel, in order to form an electric current path from a low voltage side to a high voltage side.

3. The DC-DC converter according to claim 2, wherein
the flywheel switch is implemented by a MOSFET, and a parasitic diode of the MOSFET is employed as the diode parallel to the flywheel switch.

4. The DC-DC converter according to claim 1, wherein
said state detecting means is implemented by an output voltage detecting means for detecting an output voltage of the DC-DC converter.

5. The DC-DC converter according to claim 4, wherein
said output voltage detecting means is implemented by a means for outputting a different signal depending on a result of a comparison made between the output voltage of the DC-DC converter and a reference voltage.

6. The DC-DC converter according to claim 5, wherein
said output voltage detecting means compares a voltage generated by resistors which split the output voltage of the DC-DC converter with the reference voltage.

7. The DC-DC converter according to claim 1, further comprising a remote circuit for outputting a remote signal which controls the PWM control circuit, wherein
said state detecting means is implemented by a remote signal detecting means for detecting the remote signal from the remote circuit.

8. The DC-DC converter according to claim 7, wherein
said remote signal detecting means is an inverter which inverts the remote signal to output the inverted signal as the control instruction signal.

9. The DC-DC converter according to claim 1, wherein
said state detecting means is implemented by a main transformer voltage detecting means for detecting an output voltage on the secondary side of the main transformer.

10. The DC-DC converter according to claim 9, wherein
said output voltage detecting means is implemented by a means for outputting a different signal depending on a result of a comparison made between the output voltage on the secondary side of the main transformer and a reference voltage.

11. The DC-DC converter according to claim 10, wherein
said output voltage detecting means compares a voltage generated by resistors which split the output voltage on the secondary side of the main transformer with the reference voltage.

12. The DC-DC converter according to claim 1, wherein
said controlling means is a means for controlling a driving circuit which controls an on/off state of the flywheel switch, and is implemented by a means for controlling the driving circuit based on the oscillation signal output from the PWM control circuit and the control instruction signal from said state detecting means; and said controlling means controls the driving circuit to turn off the flywheel switch, if the control instruction signal is input from said state detecting means.

13. The DC-DC converter according to claim 12, wherein
said controlling means is arranged in parallel to a switching means for transmitting an output from the PWM control circuit to the driving circuit for the flywheel switch.

14. The DC-DC converter according to claim 12, wherein
said controlling means is implemented by a transistor element.

15. The DC-DC converter according to claim 12, wherein
said controlling means is an AND gate circuit to which an output from the PWM control circuit, and an output from said state detecting means are input.

* * * * *